United States Patent [19]

Suda

[11] Patent Number: 5,149,470

[45] Date of Patent: Sep. 22, 1992

[54] METHOD OF MAKING A DIAPHRAGM OF CARBONACEOUS MATERIAL

[75] Inventor: Yoshihisa Suda, Fujioka, Japan

[73] Assignee: Mitsubishi Pencil Co., Ltd., Tokyo, Japan

[21] Appl. No.: 368,762

[22] Filed: Jun. 20, 1989

[51] Int. Cl.$^5$ .................. C01B 31/02; C01B 31/04

[52] U.S. Cl. .................. 264/29.6; 264/344; 423/448; 423/449

[58] Field of Search .................. 264/29.1, 29.5, 29.6, 264/29.7, 234, 344, 345; 423/445, 448, 449; 524/100, 101, 495, 496, 567, 568, 750; 525/331.5, 331.6, 350, 351, 375

[56] References Cited

PUBLICATIONS

Abstract of Japanese Reference 61-151,282.

*Primary Examiner*—Leo B. Tentoni
*Attorney, Agent, or Firm*—Oliff & Berridge

[57] ABSTRACT

The invention relates to a method for manufacturing a full carbonaceous diaphragm for acoustic equipment, which bridging agent which accelerates bridging by reacting, when heated, with a chlorine-containing resin component used as a raw material for carbonation binder binding said graphite powder, kneading the mixture sufficiently to which a resin component dissolution solvent or a plasticizer is added by using a mixer having high shearing force, developing a great affinity for the cloven graphite crystals and the binder resin and dispersing them by a mechanochemical reaction, making the mixture in a sheet form with the graphite crystal face thereof being highly oriented in the face direction of the film, preforming said sheet into a film or a sheet form having a desired thickness by passing it through the calender rolls, molding the preformed film or sheet into a diaphragm shape, removing the contained solvent or plasticizer therefrom by treatment in heated air, accelerating the bridging reaction of the chlorine-containing resin with the bridging agent to obtain a completely hardened molding showing no heat deformation, and sintering the hardened molding in an inert atmosphere, the manufacturing full carbonaceous diaphragm for acoustic equipment having less deformation caused by external forces, less sound distortion, wider reproduced sound range, clearer sound quality and more suitability for a digital-audio are as a diaphragm for speakers and microphones because of its lighter weight, higher elasticity and higher sound propagation velocity compared with the conventional diaphragm materials.

6 Claims, No Drawings

METHOD OF MAKING A DIAPHRAGM OF CARBONACEOUS MATERIAL

BACKGROUND OF THE INVENTION

The present invention relates to a method for manufacturing full carbonaceous diaphragm for acoustic equipment. More particularly, the present invention relates to a method for manufacturing full carbonaceous diaphragm for acoustic equipment having less deformation caused by external forces, less sound distortion, wider reproduced sound range, clearer sound quality and more suitability for a digital-audio are as a diaphragm for speakers and microphones because of its lighter weight, higher elasticity and higher sound propagation velocity compared with the conventional diaphragm materials.

In general, a diaphragm for speakers and the like meets desirably the following conditions:
(1) Its density is small,
(2) Its Young's modulus is large,
(3) Its propagation velocity of longitudinal waves is high,
(4) Its inner vibration loss is suitably large,
(5) It is stable to the varying air conditions, and shows no deformation and degradation, and
(6) It can be manufactured easily and cheaply.

That is, the diaphragm must be highly stiff, show no distortion such as creep caused by external forces, and have a high sound propagation velocity so that the sound range reproduced with fidelity over a wide frequency band may be wide and effective, and so that the obtained sound quality may be clear.

The formula $$V=(E/\rho)^{\frac{1}{2}}$$

(wherein, V: sound velocity; E: Young's modulus; ρ: density) requires a material of small density and high Young's modulus in order to increase the sound velocity. Conventionally, as materials for a diaphragm, a glass fiber or carbon fiber composite material whose substrate is paper (pulp), plastics and both of them, as well as metals such as aluminum, titanium, magnesium, beryllium, boron, etc., and the alloys, nitrides, carbides, borides, etc. thereof have been used. However, paper (pulp), plastics and the composite materials thereof have disadvantages in that it is difficult to realize a clear sound quality because of their low ratio of Young's modulus and density, therefore low sound velocity, divided vibrations induced in a certain mode, remarkably lowered frequency characteristics particularly in a high frequency band, that they are easily affected by outer circumstances such as temperature, humidity, etc., and that the characteristics are lowered because of their quality deterioration and fatigue on standing.

On the other hand, metal plates made of aluminum, titanium, magnesium, etc. have higher sound velocity and superior performances as compared with paper and plastics, but have still disadvantages in that the characteristics thereof are lowered by their sharp resonance phenomena in a high frequency band and by their fatigue on standing such as creep of the material because they have a small $E/\rho$ value and sustain a small inner loss of vibrations. Beryllium and boron are ideal materials having superior physical constants, and squawkers and tweeters whose diaphragm is made of said materials can reproduce the signals in an audible range correctly without transient phenomena and realize a natural sound quality because the reproduction limits thereof extend beyond the audible frequency range. These materials are, however, poor resources, very expensive and difficult to process industrially, and also have disadvantages in that the processing cost thereof is extremely high and that large speakers are very difficult to manufacture because said materials are less practical when using the conventional diaphragm manufacturing method comprising rolling and pressing, and because the evaporation method must be used wherein high technologies such as C.V.D., P.V.D., etc. are required. Besides these materials full carbonaceous diaphragms for acoustic equipment have been developed by paying attention to a high $E/\rho$ value of carbon materials.

Of the full carbonaceous diaphragms obtained up to the present, the diaphragm using a highly oriented high elastic material as a important element for a high sound velocity is difficult to realize a high sound velocity.

When mixing only a binder resin and a high elastic material and molding the mixture, a process for obtaining a carbon precursor takes much time, and the obtained sinter is susceptible to deformations and distortions.

On the other hand, the method for manufacturing a carbon diaphragm by means of C.V.D. etc. is unsuitable for mass production, is complicated in the manufacturing processes, and is difficult to obtain a high velocity diaphragm.

The object of the present invention is to provide a method for manufacturing a full carbonaceous diaphragm for acoustic equipment without the above-mentioned disadvantages.

The inventor of this application has made enthusiastic research and development activities in consideration of the above-mentioned disadvantages in order to develop a method for manufacturing a full carbonaceous diaphragm wherein the functional characteristics of a carbon material are fully exhibited, no complicated processes are needed, and the molded shapes are completely preserved, and finally the inventor has succeeded in completing a method for manufacturing a full carbonaceous diaphragm for acoustic equipment according to the present invention.

The inventor of this application has used his originality in order to mold a composite carbon film containing high elastic high crystalline graphite crystals highly oriented in the face direction of the film into a desired shape by using a resin carbon as binder as a result of having perceived that the high crystalline graphite crystals are plate-like and flat, and that their theoretical elasticity of 1020 GPa is very high as compared with the other materials.

On the other hand, in searching for raw materials for a binder which doesn't deform the initial molded shape of the composite carbon film even after sintering, it was found that a chlorine-containing resin to which DB, TTCA or AN was added as a bridging agent, showed behaviors as a thermoplastic resin fully at the time of molding, so that it could be thermoplastically molded easily, that the contained solvent or bridging agent was removed by heating in the air after molding, and the bridging reaction was carried out completely by the bridging agent, and that the carbonized binder was changed insoluble and infusible to heat and solvents. Moreover, it was also found that a molding material composited with graphite powder by this carbonized binder, preserved the molded shape with a high accuracy even after sintering and exhibited its functional characteristics as a carbon material at their maximum.

Subsequently, the method for manufacturing a full carbonaceous diaphragm for acoustic equipment is described concretely.

As raw materials for a carbonized binder, one of DB, TTCA and AN causing a bridging reaction by reacting with a chlorine-containing resin when heated, and a solvent for a chlorine-containing resin or a relatively high volatile plasticizer are added to a chlorine-containing resin, high crystalline graphite powder is also added thereto, and the mixture is kneaded sufficiently by a kneader having high shearing force such as a mixing roll. As a result of this process, the cloven fine grain graphite crystals and the binder resin show a powerful affinity for each other and are dispersed sufficiently to obtain a sheet-like composition whose cloven fine grain graphite crystals are highly oriented parallel to the face direction of the film. The heat energy at the time of kneading melts the resin and accelerates the bridging reaction, but this bridging reaction is not completed and the resin is in a half-bridged state. By passing this sheet-like composition through the calender rolls, a film or sheet-like preformed body for molding with a desired thickness is obtained.

Subsequently, the preformed body is molded to a desired diaphragm shape by means of hot press molding, vacuum molding, blow molding or etc. By heating this molding removed from the mold in an air oven, the contained solvent and plasticizer are volatilized, and at the same time the bridging reaction of the chlorine-containing resin is completed to obtain a sintering precursor which is not deformed by subsequent heating. This sintering precursor is carbonized by being heated in an inert gaseous phase such as nitrogen, argon or etc. to over 500° C., preferably to 1000°~1500° C. Said precursor may be graphitized at need by being heated to over 2500° C. The thus obtained full carbonaceous diaphragm preserves its molded shape with a high accuracy and exhibits its functional characteristics as a carbon material at their maximum.

As raw materials for the carbonized binder in the present invention, a polyvinyl chloride resin, a chlorinated polyvinyl chloride resin, a polyvinyl chloride/vinyl acetate copolymer resin, a chlorinated polyethylene, or a polyvinylidene resin is used. As a bridging agent, 6-dibutyl-1,3,5-triazine-2,4-dithiol (DB), trithiocyanuric acid (TTCA), or 6-anilino-1,3,5-triazine-2,4-dithiol is added in a range of 0.1~15.0 wt. % of the carbonized binder.

And as high crystalline graphite powder, natural graphite from Madagascar, Srilanka, etc., kish graphite, graphite whisker, or etc. of an average grain size of 0.5~200 μm, preferably of under 50 μm is used, and is added in a range of 10~90 wt. %, preferably of 20~60% of the diaphragm molded composition. If the graphitization rate is too low, the aimed high velocity can not be realized, and if it is too high, the free moldability is decreased and the strength of the final product is deteriorated.

In the present invention, a complete bridging reacting takes place by heating the chlorine-containing resin to which a bridging agent is added, and as a result thereof a non-deformed product can be obtained in the subsequent heating and sintering unlike the case where no bridging agent is added to the chlorine-containing resin. When describing this bridging reaction wherein a polyvinyl chloride resin and 6-dibutyl-1,3,5-triazine-2,4-dithiol are used, said bridging reaction is considered to take place as follows:

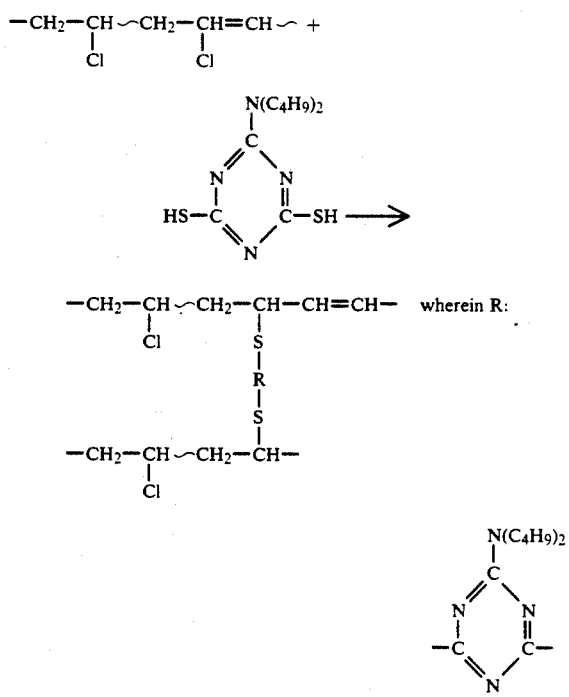

DESCRIPTION OF THE PREFERRED EMBODIMENTS

In the following, the present invention is described in detail as related to the examples, but the present invention is not limited to the examples.

EXAMPLE 1

4 wt. % of 6-dibutyl-1,3,5-triazine-2,4-dithiol (DB) was added as a bridging agent to 50 wt. % of a chlorinated vinyl chloride resin (manufactured by Japan Carbide Industry Co., Ltd., average polymerization degree: 680), they were mixed by a Henschel mixer, and 22 wt. % of dibutyl phthalate was added as a plasticizer thereto, thereby obtaining a raw material for a carbonized binder. Then 50 wt. % of natural flaky graphite whose crystals were well grown (average grain size: 7 μm) was added thereto, and they were mixed again sufficiently with the Henschel mixer. Thereafter, by kneading the raw material mixture by a pressurizing kneader and two rolls, a strong shearing force was applied to the mixture, thereby developing a great affinity for the cloven graphite crystals and the binder resin and dispersing them to obtain a sheet-like composition with the graphite crystal face thereof being highly oriented in the face direction of the film face. Subsequently, a film having a thickness of 120 μm was preformed by passing this composition through the calender rolls. The thus obtained film was molded into a dome shape of 60 mm by a vacuum molder, and was heated to a temperature of 200° C. in a die, thereby removing a part of the plasticizer and accelerating the bridging reaction sufficiently to obtain a molding. By heating this molding to a temperature of 300° C. in an air oven, the plasticizer was removed completely and the bridging reaction was completed, thereby obtaining a sintering precursor.

Subsequently, by heating the sintering precursor in a nitrogen atmosphere at the rate of 15° C./hr. till 500° C. and at that of 40° C./hr. between 500°~1000° C., and sintering it for 5 hours at a temperature of 1000° C., a full carbonaceous diaphragm was obtained. The thus obtained diaphragm had a film thickness of 45 μm and a dome size of 58 mm, and exhibited a density of 1.72 g/cm$^3$, a Young's modulus of 256 GPa, a sound velocity of 12,200 m/sec. and a inner loss of tan δ0.043.

EXAMPLE 2

4 wt. % of 6-anilino-1,3,5-triazine-2,4-dithiol (AN) was added as a bridging agent to 40 wt. % of a vinyl chloride/vinyl acetate copolymer resin (manufactured by Japan Zeon Co., Ltd., average polymerization degree: 800), they were mixed by a Henschel mixer, and 22 wt. % of dibutyl phthalate was added as a plasticizer thereto, thereby obtaining a raw material for a carbonized binder. Then 60 wt. % of natural flaky graphite whose crystals were well grown (average grain size: 4 μm) was added thereto, and they were mixed again sufficiently with the Henschel mixer. Thereafter, a film having a thickness of 100 μm was obtained in the same way as in Example 1. The thus obtained film was molded into a dome shape of 40 mm, and was processed in the same way as in Example 1, thereby obtaining a full carbonaceous diaphragm. The obtained diaphragm showed no deformation, had a film thickness of 30 μm and a dome size of 38 mm, and exhibited a density of 1.78 g/cm$^3$, a Young's modulus of 270 GPa, a sound velocity of 12,300 m/sec. and a inner loss of tan δ0.045.

What is claimed is:

1. A method for manufacturing a carbonaceous diaphragm for acoustic equipment, which comprises: mixing graphite powder with a bridging agent and a chlorine-containing resin to obtain a mixture; kneading the mixture sufficiently; adding a resin solvent and graphite powder to the mixture and mixing with a mixer having high shearing force; making the mixture into a sheet form; preforming said sheet into a film having a desired thickness by passing it through calendar rolls; molding the preformed film into a diaphragm shape; removing the contained solvent therefrom by treatment in heated air to obtain a completely hardened molding; and sintering the hardened molding in an inert atmosphere.

2. The method of claim 1, wherein said chlorine-containing resin is selected from the group consisting of a polyvinyl chloride resin, a chlorinated polyvinyl chloride resin, a polyvinyl chloride resin, a chlorinated polyvinyl chloride resin, a polyvinyl chloride/vinyl acetate copolymer resin, a chlorinated polyethylene, and a polyvinylidene resin.

3. The method of claim 1, wherein said graphite powder is selected from the group consisting of natural graphite having a high elasticity, artificial graphite, kish graphite, pilographite, and ultra-high elastic graphite whisker.

4. The method of claim 1, wherein the bridging agent is selected from the group consisting of 6-dibutylamino-1,3,5-triazine-2,4-dithiol (DB), trithiocyanuric acid (TTCA), and 6-anilino-1,3,5-triazine-2,4-dithiol.

5. The method of claim 1, wherein said solvent is a plasticizer.

6. A method for manufacturing a carbonaceous diaphragm for acoustic equipment, which comprises: mixing a bridging agent with a chlorine-containing resin to obtain a mixture; kneading the mixture sufficiently; adding a resin solvent and graphite powder to the mixture and mixing with a mixer having high shearing force; making the mixture into a sheet form; preforming said sheet into a film having a desired thickness by passing it through calender rolls; molding the preformed film into a diaphragm shape; removing the contained solvent therefrom by treatment in heated air to obtain a completely hardened molding and sintering the hardened molding in an inert atmosphere.

* * * * *